US010169830B2

(12) United States Patent
Smith et al.

(10) Patent No.: US 10,169,830 B2
(45) Date of Patent: Jan. 1, 2019

(54) ADJUSTING SENTIMENT SCORING FOR ONLINE CONTENT USING BASELINE ATTITUDE OF CONTENT AUTHOR

(71) Applicant: Adobe Systems Incorporated, San Jose, CA (US)

(72) Inventors: Kevin Gary Smith, Lehi, UT (US); William Brandon George, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 393 days.

(21) Appl. No.: 15/043,170

(22) Filed: Feb. 12, 2016

(65) Prior Publication Data

US 2017/0235830 A1 Aug. 17, 2017

(51) Int. Cl.
    *G06F 17/30* (2006.01)
    *G06Q 50/00* (2012.01)
    *H04L 12/58* (2006.01)
    *G06F 17/27* (2006.01)

(52) U.S. Cl.
    CPC ......... *G06Q 50/01* (2013.01); *G06F 17/2785* (2013.01); *H04L 51/32* (2013.01)

(58) Field of Classification Search
    CPC .................................................. G06F 17/2785
    USPC ......................................................... 707/748
    See application file for complete search history.

(56) References Cited

U.S. PATENT DOCUMENTS

2009/0265332 A1* 10/2009 Mushtaq ................. G06F 17/30
2016/0314113 A1* 10/2016 Moharrami ......... G06F 17/2785

* cited by examiner

*Primary Examiner* — Baoquoc N To
(74) *Attorney, Agent, or Firm* — Wolfe-SBMC

(57) ABSTRACT

In an online environment, a baseline attitude of an author of online content is determined. Based on the baseline attitude and a raw sentiment score for an instance of online content, an adjusted sentiment score for the online content instance is generated. A variance from the baseline attitude may be detected, based on the online content of the author. In response to the variance, a current mood of the author is determined and, using the current mood and the raw sentiment score, another adjusted sentiment score for the online content instance is generated. The baseline attitude of the author may be determined using one or more of an analysis of the online content instance, a demographic profile of the author, and a subject matter area of the online content instance. The detection of the variance from the baseline attitude may incorporate a frequency of instances of online content.

20 Claims, 6 Drawing Sheets

_US 10,169,830 B2_

ADJUSTING SENTIMENT SCORING FOR ONLINE CONTENT USING BASELINE ATTITUDE OF CONTENT AUTHOR

BACKGROUND

Sentiment measurement systems for scoring online content provide information about the attitude of an author of online content by performing textual analyses of the online content. For example, social media posts can be analyzed with a variety of techniques, such as lexical affinity or keyword spotting. These methods yield information about the posted content related to its positivity or negativity. However, situations can arise in which this kind of sentiment measure does not accurately convey information about the online content, reducing its usefulness.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, in an online environment a baseline attitude of an author of a current instance of online content is determined by an attitude module of a computing device, using raw sentiment scores of a number of prior online content instances. The raw sentiment score is a sentiment score for the online content instance that is generated based on the sentiment of the online content instance in isolation without considering the personality of the author. The baseline attitude identifies a personality of the author. Based on the baseline attitude and the raw sentiment score for the online content instance, a scoring adjustment module generates an adjusted sentiment score for the online content instance by weighting the raw sentiment score to account for the baseline attitude. The adjusted sentiment score represents the sentiment of the author.

In accordance with one or more aspects, in an online environment a device includes a sentiment scoring module implemented at least partially in hardware to obtain a raw sentiment score for an instance of online content. The raw sentiment score is a sentiment score for the online content instance that is generated based on the online content instance without considering an attitude of the author. The device also includes an attitude module, implemented at least partially in hardware to determine a baseline attitude of an author of the online content instance. The baseline attitude identifies a personality of the author. Further, the device includes a scoring adjustment module implemented at least partially in hardware to generate an adjusted sentiment score for the online content instance by weighting the raw sentiment score to account for the baseline attitude. Additionally, the device includes an evaluation module implemented at least partially in hardware to use the adjusted sentiment score to categorize, and assign a sentiment value to, the online content instance. The categorization identifies the qualitative sentiment of the online content instance and the sentiment value identifies the quantitative weight of the sentiment.

In accordance with one or more aspects, in an online environment a device includes one or more processors and one or more computer-readable storage media having stored thereon multiple instructions that implement an evaluation module and a scoring adjustment module. The multiple instructions, responsive to execution by the one or more processors, cause the one or more processors to obtain, from one or more devices of the online environment, an online content instance authored by a user. An author sentiment of the user is determined by the evaluation module, based at least in part on a baseline attitude of the user that identifies a personality of the user and that has been previously adjusted over time in response to previous online content authored by the user. Based on the author sentiment and the obtained online content instance, the scoring adjustment module generates an adjusted sentiment score for the obtained online content instance by weighting a raw sentiment score to account for the baseline attitude. The adjusted sentiment score represents the sentiment of the user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
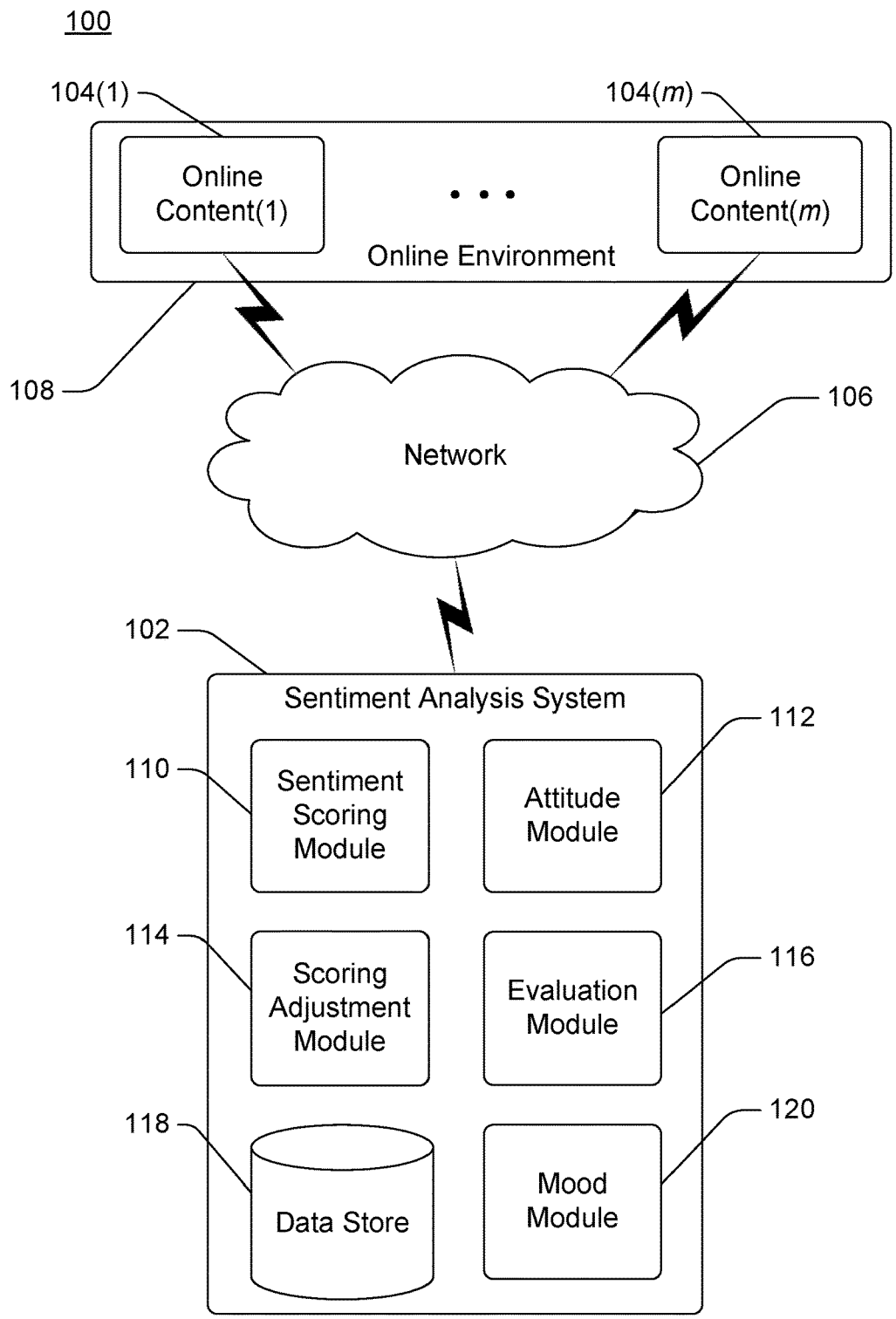
FIG. 1 illustrates an example environment implementing adjusting sentiment scoring for online content using baseline attitude of content author in accordance with one or more embodiments.

Online content has become a common and popular way for people to share their opinions, thoughts, beliefs, and so forth. Online content refers to information that a user shares or makes available to others via any of a variety of different communication mechanisms or techniques. For example, online content includes social media posts, blog posts, online transcripts of broadcast media content, web-based versions of print media, and so forth. Online content can be embodied in various formats, such as text, audio, video, multimedia presentations, and so forth.

Understanding the influence of online content has become important in many fields. Political campaigns, for instance, want to know whether and how to respond to what is being said about their candidate online. Companies, large and small, want information that provides an accurate picture of how consumers and influential reviewers are responding to their brands, products, and services—and of when it is necessary or advantageous to react to the response. A sentiment system may try to provide this information by performing textual analysis on online content (e.g., treating social media posts as atomic instances of online content) with the analysis being focused entirely on determining the sentiment of each individual instance of online content in isolation and without considering the context of the online content or the author's tendencies. This does not reflect how people usually interpret data and reduces the accuracy and value of the results. In conversations, people automatically analyze the sentiment of those with whom they are conversing. People consider the personality or "profile" of the individual, their current mood, their disposition to the current subject, and so on. To provide a more accurate and more useful understanding of online content, using the techniques discussed herein a sentiment system similarly "considers the source" when evaluating sentiment in online content.

Adjusting sentiment scoring for online content using baseline attitude of content author is discussed herein. The sentiment scoring is adjusted by incorporating the author's baseline attitude, the author's current mood, the author's disposition toward the subject matter of the content being analyzed, or a combination thereof.

The author's baseline attitude is a personality profile of the author, and indicates an author's general positivity or negativity (e.g., the author's general outlook on life or the author's disposition). The baseline attitude can be a range of values (e.g., describing the author's personality on a single axis from positive to negative). The baseline attitude can also describe the author's personality on other axes, including emotions (e.g., happy, sad, or angry), intensity (e.g., mild, moderate, strong), and so forth. Combinations of these axes are also possible. For example, a baseline attitude could be represented by a scale from 0 to 100 where 0 is negative (or sad, or unhappy, or mild), 50 is neutral (or content, or moderate), and 100 is positive (or happy, or easy-going, or strong). In another example, vector or matrix values could be used to represent a baseline attitude that combines one or more of the example axes to describe attitudes such as mildly negative, moderately angry, extremely hostile, and so forth.

Incorporating the author's baseline attitude allows more accurate sentiment scoring by compensating for the author's general positivity or negativity. For example, a negative comment from a generally negative author will be "discounted" some amount relative to a negative comment from an author with a generally positive or neutral baseline attitude.

The author's baseline attitude is determined by analyzing the author's online content—social media posts, for example. A raw sentiment score is generated for an instance of online content. The raw sentiment score is a score for the instance of online content that is generated by focusing on the sentiment of the individual instance of online content in isolation and without considering the context of the online content or the author's tendencies. The sentiment of the individual instance of online content is the view or attitude (e.g., the opinion) expressed by the author in the individual instance of online content. The raw sentiment score is generated using any of various methods such as lexical affinity, keyword analysis, statistical methods that incorporate machine learning, and more holistic methods that incorporate knowledge representation techniques like semantic networks. For example, a raw sentiment score for an instance of online content containing only the phrase "that movie was terrible" may have a raw sentiment score of 30 (on a scale from 0 to 100, e.g., similar to the negative/positive scale described above with respect to the baseline attitude). Another instance of online content may describe the same movie using 500 words and include multiple occurrences of the terms "character development", "plot" and "acting" that are each modified by one or more of the terms "strong", "excellent", and "powerful". In this example, the online content instance may have a raw sentiment score of 75 on the same scale. In both examples, the only material considered in generating the raw sentiment score is the instance of online content.

When a sufficient amount of online content has been received (e.g., a threshold number of posts, such as 10 or 25), the raw sentiment scores are used to generate a baseline attitude for the author. This process can be ongoing, so that the baseline attitude is dynamic—adjusted over time as the author creates more online content. Once the author's baseline attitude is generated, it is applied to future scoring of online content.

Another factor that may be considered when determining the author's baseline attitude is a demographic profile of the author. For example, if an author has created a user profile for the social media platform from which the content under analysis is drawn, the demographic information in the user profile can be incorporated into the author's baseline attitude. This can be achieved by examining established baseline attitudes of other users with demographic profiles and looking for correlations between particular demographic profiles, or combinations of profiles, and general baseline attitudes. For example, if it is determined that baseline attitudes of people who live in the southern United States are generally positive, then new users living in this region can be assigned a positive baseline attitude. In some cases, the demographic information can be used to determine an initial baseline attitude for a new user even before the user has accrued enough online content for the abovementioned analysis.

The author's disposition toward the subject matter of the online content can also be relevant to the author's baseline attitude. An author may have a different baseline attitude for different subject matter areas. For example, a sports fan might have a generally positive baseline attitude, but a more negative attitude when posting about a particular sports franchise. In this example, the author's negative subject-matter attitude replaces his or her baseline attitude. In this way, a positive comment about the franchise has more weight than it otherwise would have (because in the absence of the subject matter adjustment, positive comments from authors with more positive baseline attitudes are slightly discounted). Additionally, the subject matter and demographic profile may be related. For example, a particular demographic profile, as discussed above, may also be correlated to different subject-matter attitudes for particular topics. Residents of Los Angeles or San Francisco, for example, may have very negative subject-matter attitudes when the subject is traffic, even if their baseline attitude is neutral or positive. In some embodiments, the subject-matter attitude does not replace the baseline attitude, but is incorporated into the baseline attitude.

The author's current mood can also be incorporated into the sentiment scoring. When the recent history of an author's online content indicates that the raw sentiment scores of current postings are varying from what would be expected (based on his or her baseline attitude), the author's baseline attitude can be adjusted to account for the author's mood. For example, if an author's baseline attitude is generally positive and a series of very negative posts are detected, the author's baseline attitude may be temporarily adjusted to be less positive. Because the concept of "mood" is transient, this adjustment of the author's baseline attitude to account for mood may include a time decay element so that, over time, the baseline attitude metric trends back toward its level prior to the mood adjustment. However, if the negative posting continues, the cumulative effect of the posts will alter the author's baseline attitude even after the particular mood decays away. Various factors that may influence the determination of the author's mood include the magnitude of the variation in the sentiment (negativity or positivity) of the online content, changes in posting frequency, and so forth.

Given an author's baseline attitude, a more accurate and useful adjusted sentiment score can be generated for each of the author's posts. For instance, for an author with a more negative baseline attitude, positive posts will be given slightly more positive sentiment scores because a positive comment from a negative commentator ought to be given a little more weight than the raw score alone would indicate. Similarly, if that generally negative author posts a series of very positive comments, it may be an indication of a particular good mood and the sentiment scores are adjusted to reflect that as well. Further, when an author with a generally negative baseline attitude has a more positive attitude for a particular topic, then the raw sentiment scores for the author's positive comments related to that subject matter will be adjusted to account for the subject-matter attitude. If appropriate, the adjusted sentiment scores can also be further adjusted to account for demographic correlation to the subject matter.

The term author sentiment refers to a sentiment (as exposed or reflected in an online environment) of the author of an instance of online content, and incorporates both the baseline attitude of the author and the raw sentiment score for the instance of online content. For example, the techniques discussed herein can be used to generate a specific score for a particular instance of online content (e.g., a single social media post of "I will never buy that product again" might generate an adjusted sentiment score of 25). However, in addition to its quantitative value, the adjusted sentiment score also reflects, in a qualitative sense, a negative author sentiment. Accordingly, the negative online content instance described above ("I will never buy that product again"), when posted by an author with a baseline attitude of 20 (i.e., a negative baseline attitude), would indicate an author sentiment that is not as negative as the raw sentiment score for the online content suggests, because the author is generally negative and negative comments from negative commenters are given less negative weight than the raw sentiment score. Continuing the example, the same negative online content instance, when authored by an author with a positive baseline attitude (e.g., 70) indicates a more negative author sentiment than the raw sentiment score suggests because negative comments from positive commenters are given more negative weight.

The term author tendencies is a qualitative description of the author's baseline attitude. This can be the author's baseline attitude alone, or in combination with the subject-matter attitude and/or mood. As described herein, an algorithm can be applied to the online content instances of an author to determine a quantitative baseline attitude or subject-matter attitude. In addition to the determined attitude, however, the online content instances also qualitatively describe an author's tendencies. Using various techniques and methods, an author who often uses terms such "adequate", "decent", and "reasonable for the price" might have an author tendency of "neutral" or "objective". In contrast, an author tendency of "negative" or "critical" might be used to describe an author who regularly employs the terms "awful", "unusable", and "never going back". The author's mood is also relevant to author tendencies. For example, an author with a slightly positive baseline attitude whose online content also indicates frequent moods (as described above), that vary widely from the baseline attitude (e.g., who frequently has current moods, some that are very negative and some that are very positive), might have an author tendency of "moody" or "unpredictable". On the other hand, an author with infrequent moods, or moods that are generally similar in magnitude and/or direction, might have an author tendency of "stable" or consistent".

The methods, techniques, and devices described herein operate in an online environment. The online environment is an environment of networked devices in which authors can post, publish, or otherwise write content that can be viewed by other people using different devices. The online environment can be any of a variety of environments that exist on one or more networks such as the Internet, a local area network (LAN), a phone network, a private network, and so forth. Online environments allow content to be posted, published, or otherwise written via, for example, social media services, weblogs, websites (e.g., a news organization website), online message boards, and so forth.

FIG. 1 illustrates an example environment 100 in which the improved sentiment scoring for online content can be implemented in accordance with one or more embodiments. The example environment 100 includes a sentiment analysis system 102 that can access and analyze one or more (m) instances of an author's online content 104 via a network 106. The network 106 can be a variety of different networks, including the Internet, a local area network (LAN), a phone network, an intranet, other public and/or proprietary networks, combinations thereof, and so forth.

The sentiment analysis system 102 can be implemented using one or more of any of a variety of different types of devices. For example, the sentiment analysis system 102 can be implemented using a desktop computer, a server computer, a laptop or netbook computer, a tablet or notepad computer, a mobile station, an entertainment appliance, a set-top box communicatively coupled to a display device, a television or other display device, a cellular or other wireless phone, a wearable computer, a game console, an automotive computer, and so forth. Thus, the sentiment analysis system 102 may be implemented using devices ranging from a full resource device with substantial memory and processor resources (e.g., personal computers, game consoles) to a low-resource device with limited memory and/or processing resources (e.g., traditional set-top boxes, hand-held game consoles).

The online content 104 be any of a variety of different media and formats that may exist in an online environment 108 and that can be communicated via the network 106. For example, the online content instances 104(1)-104(m) could be in the form of text, audio, video, multimedia presentations, and so forth. As noted, the online environment 108 can be any of a variety of environments. In one or more embodiments, each online content instance 104(1)-104(m) is a single piece of the author's online content, such as a single blog post, a single comment, a single article, and so forth. Alternatively, at least one of the online content instances 104(1)-104(m) can be multiple pieces of the author's online content, such as multiple blog posts (e.g., on the same subject), multiple comments (e.g., on the same news article), and so forth.

In one or more embodiments, the sentiment analysis system 102 includes a sentiment scoring module 110, an attitude module 112, a scoring adjustment module 114, an evaluation module 116, a data store 118, and a mood module 120. The sentiment scoring module 110 obtains raw sentiment scores for each online content instance 104. Obtaining the raw sentiment scores may involve generating the scores or accessing, via the network 106, another resource that generates the raw sentiment scores. The attitude module 112 analyzes the raw sentiments scores for the online content 104 and determines a baseline attitude for the author of the online content 104.

Additionally or alternatively, in one or more embodiments, the attitude module 112 determines whether the author has an attitude for a particular topic that is different from the author's baseline attitude. If so, the attitude module 112 then generates a subject-matter attitude for the author. The subject-matter attitude describes a personality of the author with respect to the particular subject matter. The author may have a different subject-matter attitude for one or more different topics. For example, an author with a baseline attitude that is generally neutral may also have a positive subject-matter attitude when the topic of the online content is Italian food, as well as a negative subject-matter attitude when the topic is winter weather. The subject-matter attitude for each topic can be stored and maintained as necessary in a memory (e.g. data store 118), so that the subject-matter attitude is available for use together with, or in place of, the author's baseline attitude, as described herein.

The scoring adjustment module 114 generates an adjusted sentiment score that embodies, for each online content instance 104, a representation of the author's sentiment. The adjusted sentiment score is generated using the baseline attitude for the author to adjust the raw sentiment score for the online content instance 104. The scoring adjustment module 114 optionally includes an adjustment regulating metric that specifies the maximum amount a raw sentiment score can be adjusted, and minimum and maximum values for the raw and adjusted sentiment scores. The scoring adjustment module 114 stores the categorization in a memory (e.g. data store 118) for later retrieval and use as described above (e.g., in political campaigns, brand management, and so forth). In one or more embodiments, the scoring adjustment module 114 generates a subject-matter-adjusted sentiment score for an online content instance 104 that is related to a topic for which the author has a the subject-matter attitude. The subject-matter-adjusted sentiment score is generated using the subject-matter attitude to adjust the raw sentiment scores for the author's online content instance 104. Additionally or alternatively, the scoring adjustment module 114 may use the subject-matter attitude in combination with the baseline attitude.

In one or more embodiments, the evaluation module 116 uses the adjusted sentiment score for each online content instance 104 to generate a categorization that identifies the qualitative nature of the online instance content 104 (e.g., negative, positive, angry, happy, and so forth) and optionally a sentiment value that identifies the quantitative weight of the sentiment (e.g., how happy the adjusted sentiment score indicates the user is). Alternatively, or additionally, the evaluation module 116 determines an author sentiment (also referred to as a user sentiment) based on the author's baseline attitude. The user sentiment indicates a qualitative attitude of the user of the online environment. The evaluation module 116 stores the categorization and optional sentiment value in data store 118 for later retrieval and use as described above (e.g., in political campaigns, brand management, and so forth).

In one or more embodiments, an association between the online content instance 104 and the categorization and/or adjusted sentiment score for that online content instance 104 is also maintained in the data store 118. This association can be stored in the data store 118 by, for example, the scoring adjustment module 114 and/or the evaluation module 116. This association can use various different indicators to identify the online content instance 104, such as a uniform resource locator (URL) or other identifier that allows different online content instances 104 to be distinguished from one another. This association can be maintained using various different data structures such as a table, list, database entry, and so forth.

The categorization and/or adjusted sentiment score can be used in various manners, such as to prioritize online content instances 104 that are presented to a user. For example, a user may select to have online content instances 104 with the most negative scores first, followed by the online content instances 104 with the best happiness values, and so forth. Additionally or alternatively, the categorization and/or adjusted sentiment score may be used to determine whether some event occurs, such as an alert or notification provided to the user. For example, a user who has instituted a campaign to please a particular customer demographic may select to receive an alert when positive or happy online content instances 104 are posted by authors in the targeted demographic, when online content instances 104 having adjusted sentiment scores that exceed a threshold value are posted by authors in the targeted demographic, and so forth.

The sentiment analysis system 102 optionally includes a mood module 120, implemented at least partially in hardware, that detects, in the raw sentiment scores, variations from the baseline attitude over a time period. The mood module 120 uses the variation to determine the current mood of an author of the online content 104. The mood describes a temporary personality profile of the author. The scoring adjustment module 114 can use the mood to generate a mood-adjusted sentiment score that embodies, for each online content instance 104, a representation of the author's sentiment that may differ from the sentiment represented by the adjusted sentiment score described above. Additionally or alternatively, the scoring adjustment module 114 can incorporate a time decay element when generating the mood-adjusted sentiment score using the current mood. As described above, the author's current mood is transient—the author's mood reflects variations over a time period as the author's current mood changes. The time decay element is used to detect when the author's mood is trending back toward the author's baseline attitude, and the scoring adjustment module 114 can then resume generating the adjusted sentiment score that is based on the author's baseline attitude.

Although particular functionality is discussed herein with reference to particular modules, it should be noted that the functionality of individual modules discussed herein can be separated into multiple modules, and/or at least some functionality of multiple modules can be combined into a single module.

Figure 2:
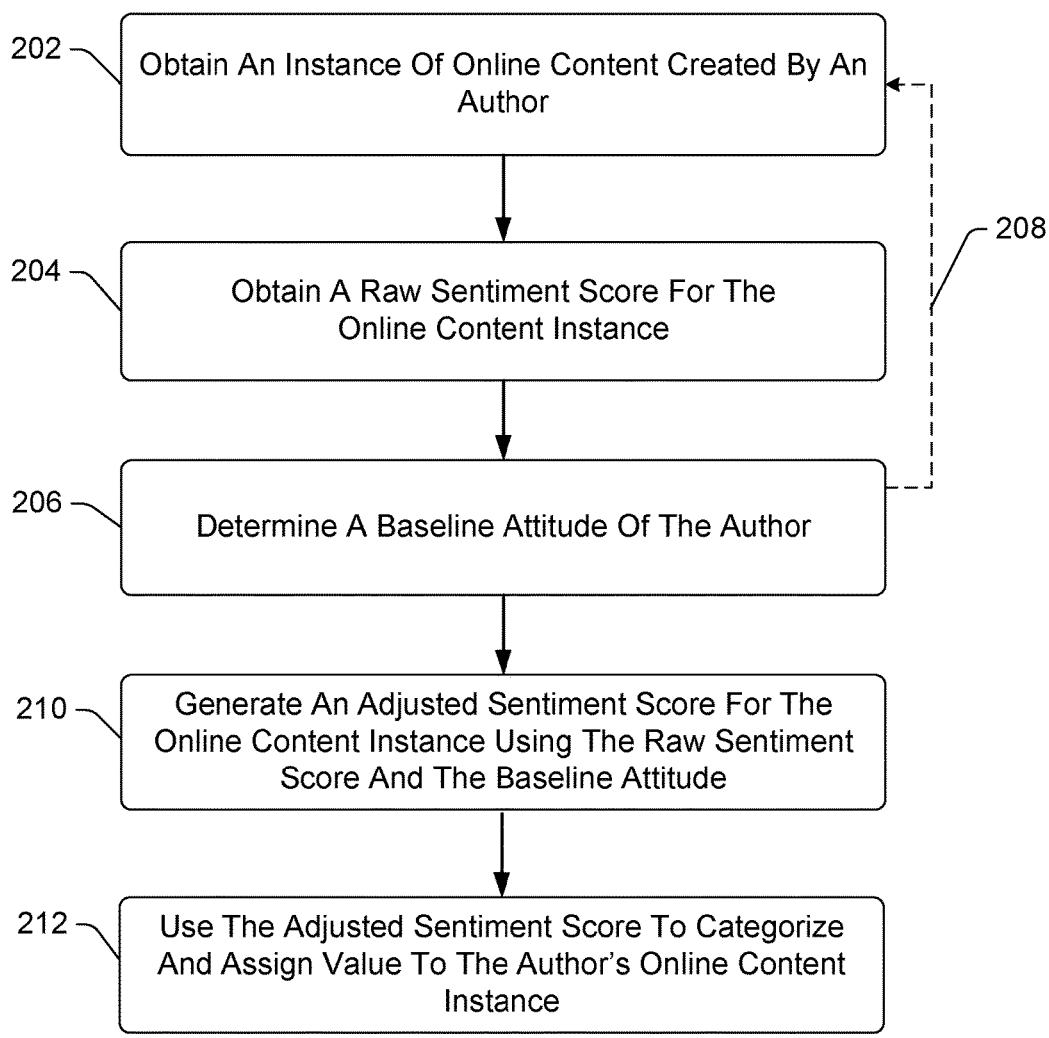
FIG. 2 is a flowchart illustrating an example process for adjusting sentiment scoring for online content using baseline attitude of content author in accordance with one or more embodiments.

FIG. 2 is a flow chart illustrating an example process 200 for adjusting sentiment scoring for online content using baseline attitude of content author in accordance with one or more embodiments. The process 200 is performed by a system such as the sentiment analysis system 102 of FIG. 1. The process 200 can be implemented in software, firmware, hardware, or combinations thereof. The process 200 is shown as a set of acts and is not limited to the order shown for performing the operations of the various acts. The process 200 is an example process for adjusting sentiment scoring for online content using baseline attitude of content author; additional discussions of adjusting sentiment scoring for online content using baseline attitude of content author are included herein with reference to different figures.

In the process 200, an instance of online content created by an author is obtained (act 202). The online content instance can be obtained via a network, such as the network 106 of FIG. 1. Additionally or alternatively, the online content instance may be obtained in other manners, such as from a memory device to which the online content has been saved (e.g., the data store 118 in sentiment analysis system 102 of FIG. 1).

A raw sentiment score for the online content instance is also obtained (act 204). As explained above with reference to FIG. 1, obtaining a raw sentiment score may involve generating the scores or accessing, via a network, another resource that generates the raw sentiment scores. The raw sentiment score for an online content instance can be generated using any of a variety of different public and/or proprietary techniques to analyze the online content instance by focusing on the sentiment of the individual online content instance in isolation and without considering the context of the online content instance or the author's tendencies. Examples of such techniques include lexical affinity, keyword analysis, statistical methods that incorporate machine learning, more holistic methods that incorporate knowledge representation techniques like semantic networks, and so forth.

In response to obtaining the online content instance and the raw sentiment score, a baseline attitude of the author of the online content instance is determined (act 206). The author's baseline attitude describes the author's personality, based on a threshold number of the raw sentiment scores of the author's online content (e.g., 10 or 25). The author's baseline attitude can be generated by a module such as the attitude module 112 of FIG. 1, using any of a variety of public and/or proprietary techniques, such as averaging the raw sentiment scores, averaging a particular number of the most recent raw sentiment scores, providing a weighted average of the raw sentiment scores (the weights based on various different characteristics of the online content instance such as the time of day of creation of the online content instance, the day of the week of creation of the online content instance, the amount of content (e.g., the number of words) in the online content instance), and so forth. As shown by the feedback loop 208, determining the baseline attitude of an author is an iterative process. Each time an online content instance is authored, a raw sentiment score is obtained and incorporated into the author's baseline attitude.

Additionally or alternatively, the demographic profile of the author can be incorporated into the determination of the baseline attitude. The demographic profile may be obtained from a variety of sources (e.g., from the author's user profile in the online environment that is being used to generate the online content, from a data aggregation service that collects information from public sources available online, and so forth). If the author's demographic profile is correlated with a known baseline attitude and/or with known subject-matter attitudes, the demographic profile can be incorporated into the determination of the baseline attitude. For example, if a particular baseline attitude or subject-matter attitude is shared by people having a particular demographic characteristic (e.g., people from the same neighborhood, people of the same gender and age, etc.), then that particular baseline attitude can be used as the baseline attitude for the author. In some cases, the demographic profile may be used to establish a baseline attitude even if the author has not yet authored the threshold number of online content instance discussed with reference to act 206.

An adjusted sentiment score for the online content instance is generated using the raw sentiment score and the baseline attitude (act 210). Generally, the adjusted sentiment score is generated by adjusting the raw sentiment score to account for the baseline attitude of the author. The adjusted sentiment score can be generated by a module such as the scoring adjustment module 114 of FIG. 1, using any of a variety of public and/or proprietary techniques, including mathematical algorithms and statistical methods such as regression analysis, covariate analysis, and so forth. An example algorithm for generating adjusted sentiment scores in accordance with example process 200 is represented by the equation:

$$AdjustedScore = RawScore + (MaxAdjust \times ((RawScore - Baseline)/MaxScore))$$

where AdjustedScore is the adjusted sentiment score, RawScore is the raw sentiment score (e.g., 0-100), MaxAdjust is the adjustment regulating metric (e.g., 10), Baseline is the baseline attitude from negative to positive (e.g., 0-100), and MaxScore is the maximum possible sentiment score (e.g., 100). Using the example algorithm, a raw sentiment score that is higher or lower than the value representing the author's baseline attitude will yield an adjusted sentiment score that is respectively higher or lower than the raw sentiment score. If the raw sentiment score and the baseline have the same value, the adjusted sentiment score will be the same as the raw sentiment score because the raw score matches the attitude.

Another example algorithm for generating adjusted sentiment scores in accordance with example process 200 is represented by the equation:

$$AdjustedScore = RawScore + Min(MaxAdjust, ((RawScore - Baseline)/MaxScore))$$

where AdjustedScore, RawScore, MaxAdjust, Baseline, and MaxScore are as discussed in the previous example algorithm, and Min(a,b) refers to the lesser of a or b. It should be noted that these example algorithms for generating adjusted sentiment scores are only examples, and that various other algorithms can be used to generate adjusted sentiment scores.

The adjusted sentiment score is used to categorize and assign value to the author's online content (act 212). The category and value can be determined by using a module such as the evaluation module 116 of FIG. 1. The categorization and assigned value may be used in a variety of ways, as described above with reference to FIG. 1. For example, the range of adjusted sentiment scores can be divided into tiers (e.g., 0-20 is "angry", 21-40 is "unhappy", 41-60 is "normal", 61-80 is "pleased", and 81-100 is "happy") that represent the categories. Where the value of the adjusted sentiment score falls in the tier represents the value. In this example, one of the categories is "unhappy" (21-40) and if the particular score is 23, the value would be an intensity (e.g., "very"), and the overall result is "very unhappy". Similarly, if the particular score is 37, the overall result might be "somewhat unhappy" (i.e., the value 37 represents "somewhat"), and so forth for various combinations of categories and values.

Additionally or alternatively, the evaluation module 116 can generate values or descriptions that characterize author sentiment or author tendencies, as described above, that can be used to assist in the development of strategies and tactics for determining if, when, and/or how to respond to instances of online content by particular authors.

Additionally or alternatively, when the subject matter of an online content instance includes subject matter for which there is a subject-matter attitude for the author, as described above with reference to FIG. 1 (e.g., when an analysis of the online content instance, which can be performed using any of a variety of techniques such as lexical affinity, keyword analysis, and so forth, indicates a particular subject matter for the online content instance), a subject-matter-adjusted sentiment score is generated as described above with reference to act 210, using the subject-matter attitude in place of, or in combination with, the baseline attitude. For example, an author with a baseline attitude that is generally neutral may also have a positive subject-matter attitude when the topic of the online content is Italian food. In this example, an online content instance (e.g., a social media post) from this author that describes a new steakhouse restaurant as "pretty good" might have a more positive adjusted sentiment score because the author's baseline attitude is neutral. If, however, the new restaurant serves Italian food, the same online content instance ("pretty good") might get a more negative subject-matter-adjusted sentiment score because the author's subject-matter attitude is positive.

Figure 3:
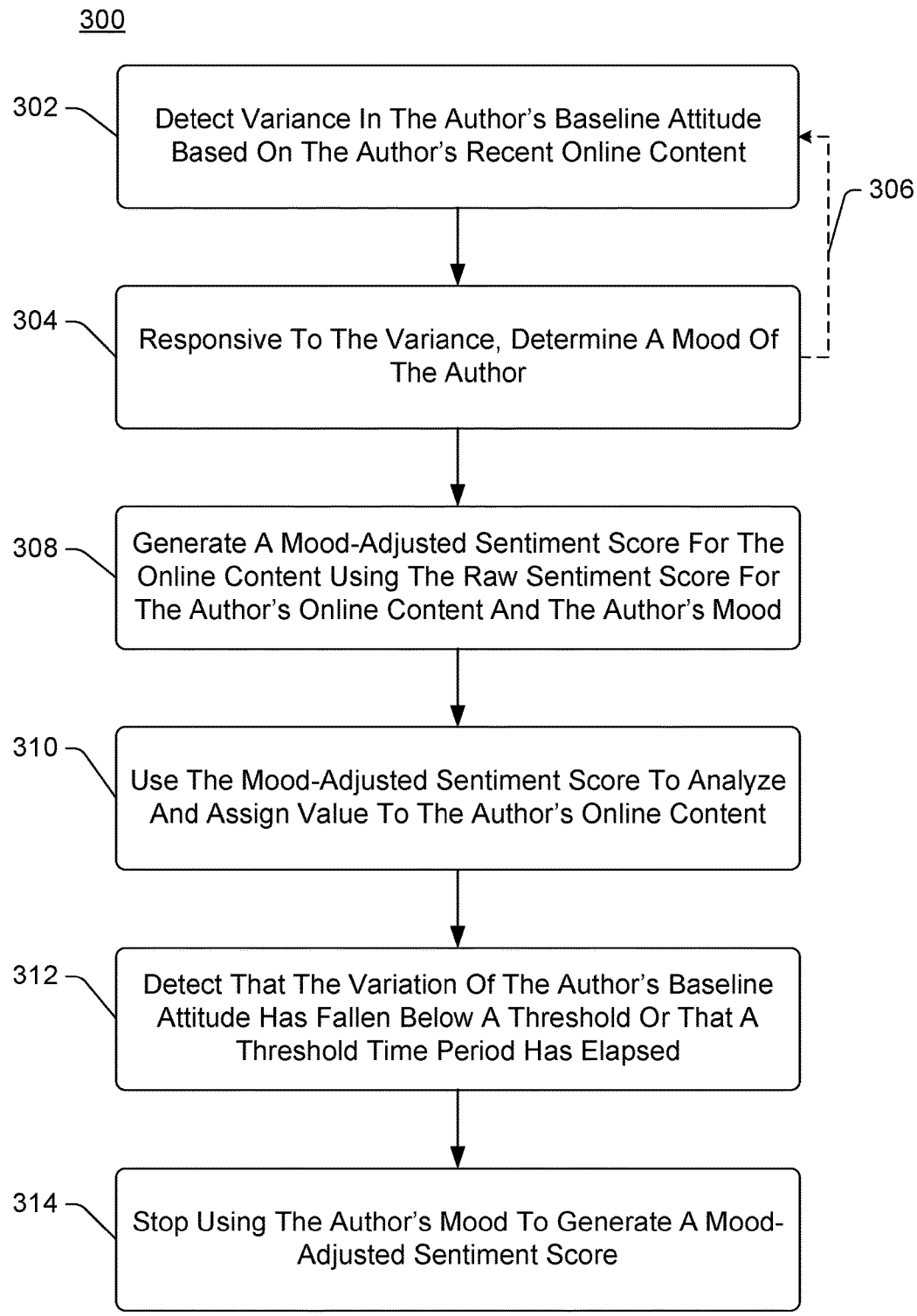
FIG. 3 is another flowchart illustrating an example process for adjusting sentiment scoring for online content using baseline attitude of content author in accordance with one or more embodiments

FIG. 3 is a flow chart illustrating an example process 300 for adjusting sentiment scoring for online content using baseline attitude of content author in accordance with one or more embodiments. The process 300 is performed by a system such as the sentiment analysis system 102 of FIG. 1. The process 300 can be implemented in software, firmware, hardware, or combinations thereof. The process 300 is shown as a set of acts and is not limited to the order shown for performing the operations of the various acts. The process 300 is an example process for adjusting sentiment scoring for online content using baseline attitude of content author; additional discussions of adjusting sentiment scoring for online content using baseline attitude of content author are included herein with reference to different figures.

In the process 300, a mood module detects a variance in an author's baseline attitude (act 302). The baseline attitude is described above with reference to FIGS. 1 and 2. The mood module may be a module such as the mood module 120 described with reference to FIG. 1. The variance may be detected using a variety of techniques, such as a comparison between the recent raw sentiment scores of the author's online content and the author's baseline score. The variance may be detected in a variety of ways. For example, a variance may be detected if a threshold number of an author's online content instances are authored within a specified time period and have raw sentiment scores that deviate from the baseline by at least a threshold amount. In one or more embodiments, a variation in the frequency of an author's online content (e.g., how often the author generates an online content instance) is also considered in the determination of variance. For example, if an author generates an average of five online content instances per day, but then authors five instances within an hour after visiting a particular website, a variance may be detected, even if the raw sentiment scores of the five instances do not exceed the threshold deviation from the baseline attitude.

In response to the detected variance, the author's current mood is determined (act 304). The mood can be determined by a module such as the mood module 120 of FIG. 1. As described above with reference to FIG. 1, an author's mood describes a temporary personality profile of the author. If the author has a baseline attitude of 60 (on a scale where 0 is most negative and 100 is most positive) and authors five online instances in one hour, all of which have raw sentiment scores under 40 on the same scale, the author's current mood may be determined using any of a variety of techniques (e.g., a mathematical average of the five sentiment scores or an average weighted by the magnitude of the deviation, and so forth). Because an author's current mood at any given time is by definition transient, the determination of the author's mood is an iterative process, as shown by the feedback arrow 306 of FIG. 3. This iteration allows the mood to decay over time as the authors attitude reverts from the current mood back to the baseline attitude and then, at another time, to another current mood, and so forth.

Additionally or alternatively, the author's current mood may be determined using the frequency of the author's online content as described above with respect to act 302. For instance, in the above example, if the five online instances authored in the hour have raw sentiment scores below the baseline, but not in excess of the threshold value, a current mood may still be determined using similar methods. The frequency can be used in place of, or in addition to, the deviation from the baseline.

A mood-adjusted sentiment score is generated using the raw sentiment score and the author's mood (act 308). The mood-adjusted sentiment score can be generated by a module such as the scoring adjustment module 114 of FIG. 1, using any of a variety of public and/or proprietary techniques, such as mathematical algorithms, statistical methods (e.g., regression analysis or covariate analysis), and so forth. An example algorithm for generating adjusted sentiment scores in accordance with example process 300 is represented by the equation:

$$AdjustedScore = RawScore + (MaxAdjust \times ((RawScore - Mood)/MaxScore))$$

where AdjustedScore is the mood-adjusted sentiment score, RawScore is the raw sentiment score (e.g., 0-100), MaxAdjust is the adjustment regulating metric (e.g., 10), Mood is the author's current mood from negative to positive (e.g., 0-100), and MaxScore is the maximum possible sentiment score (e.g., 100). Using the example algorithm 504, a raw sentiment score that is higher or lower than the value representing the author's current mood will yield a mood-adjusted sentiment score that is respectively higher or lower than the raw sentiment score. If the raw sentiment score and the author's current mood have the same value, the mood-adjusted sentiment score will be the same as the raw sentiment score because the raw score matches the attitude. The mood-adjusted sentiment score embodies, for each instance of the online content 104, a representation of the author's sentiment that may differ from the sentiment represented by the adjusted sentiment score described above with reference to FIGS. 1 and 2.

The adjusted sentiment score can be used to categorize and assign value to the author's online content (act 310). The category and value can be determined by using a module such as the evaluation module 116 of FIG. 1. The categorization and assigned value may be used in a variety of ways, as described above with reference to FIG. 1

The ending of the variance from the author's baseline attitude is also detected (act 312). For example, the variance ending can be detected in response to the magnitude of the variation falling below a threshold value, the frequency of online content instances that vary from the author's baseline attitude falling below a threshold value, a threshold period of time having elapsed since the mood-adjusted sentiment score was first generated, and so forth.

In response to detecting that the variance from the baseline has ended, use of the author's mood to generate a mood-adjusted sentiment score ceases (act 314). This ceasing use of the author's mood to generate a mood-adjusted sentiment score accounts for the transient nature of an author's mood and allows the generating of adjusted scores based on the author's baseline attitude to resume.

Figure 4:
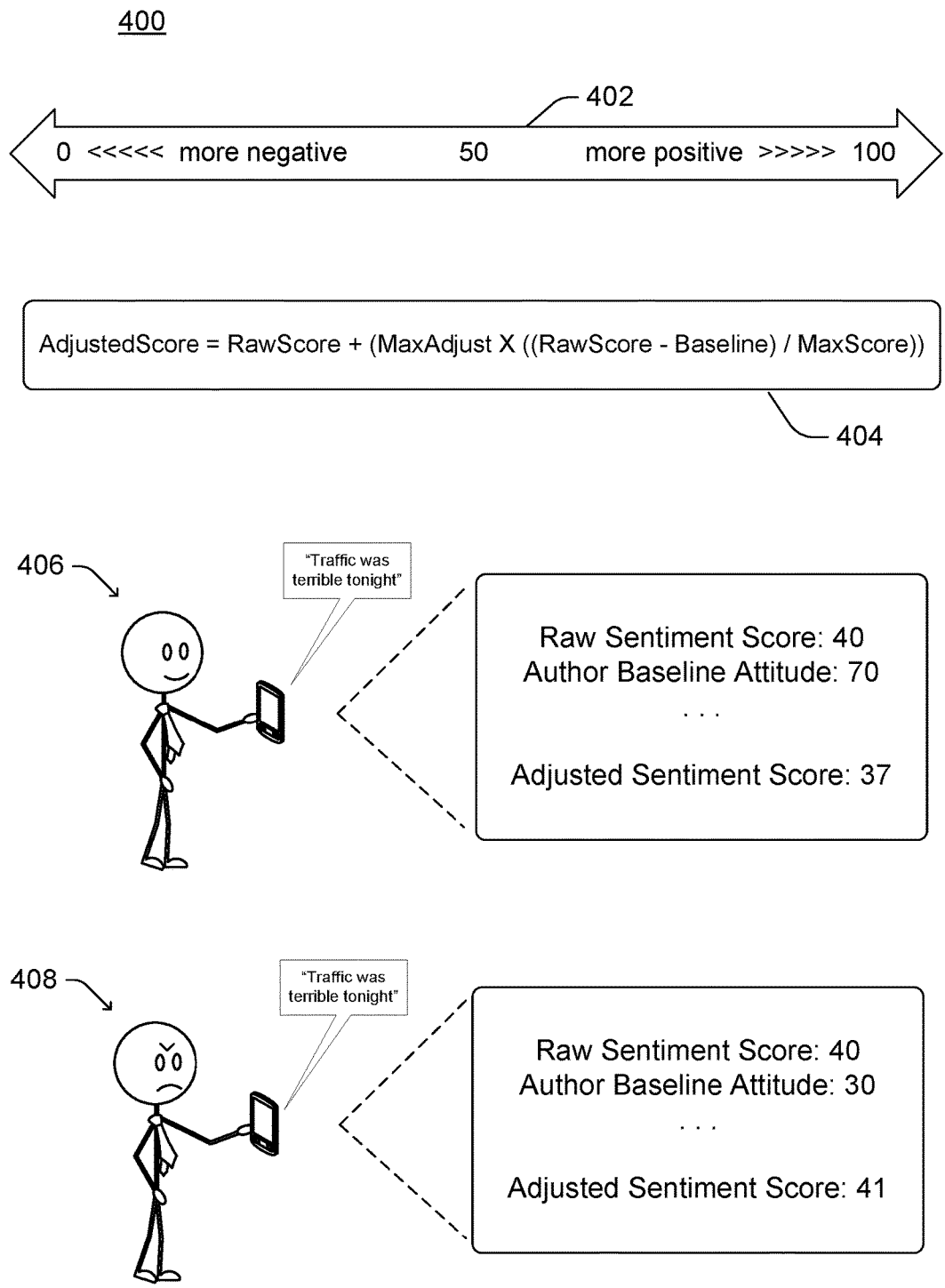
FIGS. 4 and 5 illustrate aspects of adjusting sentiment scoring for online content using baseline attitude of content author with examples of various features and concepts.

FIG. 4 presents an example scenario 400 that illustrates aspects of adjusting sentiment scoring for online content using baseline attitude of content author, including aspects similar to the example process 200 of FIG. 2. The scale 402 describes the values, from 0 to 100, used for: the raw sentiment score, baseline attitude, and adjusted sentiment scores. For example, on the scale 402, a lower number indicates a more negative sentiment, and a higher number indicates a more positive sentiment. In this example aspect of adjusting sentiment scoring for online content using baseline attitude of content author, various algorithms could be used to generate an adjusted sentiment score. The example algorithm 404 represents a possible algorithm for generating adjusted sentiment scores in accordance with example process 200.

In example scenario 400, the author Polly 406 authors the online content "traffic was terrible tonight." Polly has a baseline attitude of 70 and the raw sentiment score for the online content is 40. Using the example algorithm 404, the adjusted sentiment score for Polly's online content is 37. Because Polly's baseline attitude is more positive, negative online content is made more negative, and the adjusted sentiment score is therefore lower (i.e., more negative) than the raw sentiment score. In the example scenario 400, the author Ivan 408 also authors the online content "traffic was terrible tonight." Ivan has a baseline attitude of 30 and the raw sentiment score for the online content remains 40. Using the example algorithm 404, the adjusted sentiment score for Ivan's online content is 41. Because Ivan's baseline attitude is more negative, negative online content is made less negative, and the adjusted sentiment score is therefore higher (i.e., less negative) than the raw sentiment score.

The adjusted sentiment scores generated by the example algorithm 404 increase or decrease the value of the raw sentiment score in proportion to the difference between the raw sentiment score and the baseline attitude and the raw sentiment score for Polly's online content is adjusted down more than the raw sentiment score for Ivan's online content is adjusted up. This difference is because the distance between Polly's baseline attitude and the raw sentiment score is larger than the difference between Ivan's baseline attitude and the raw sentiment score.

Figure 5:
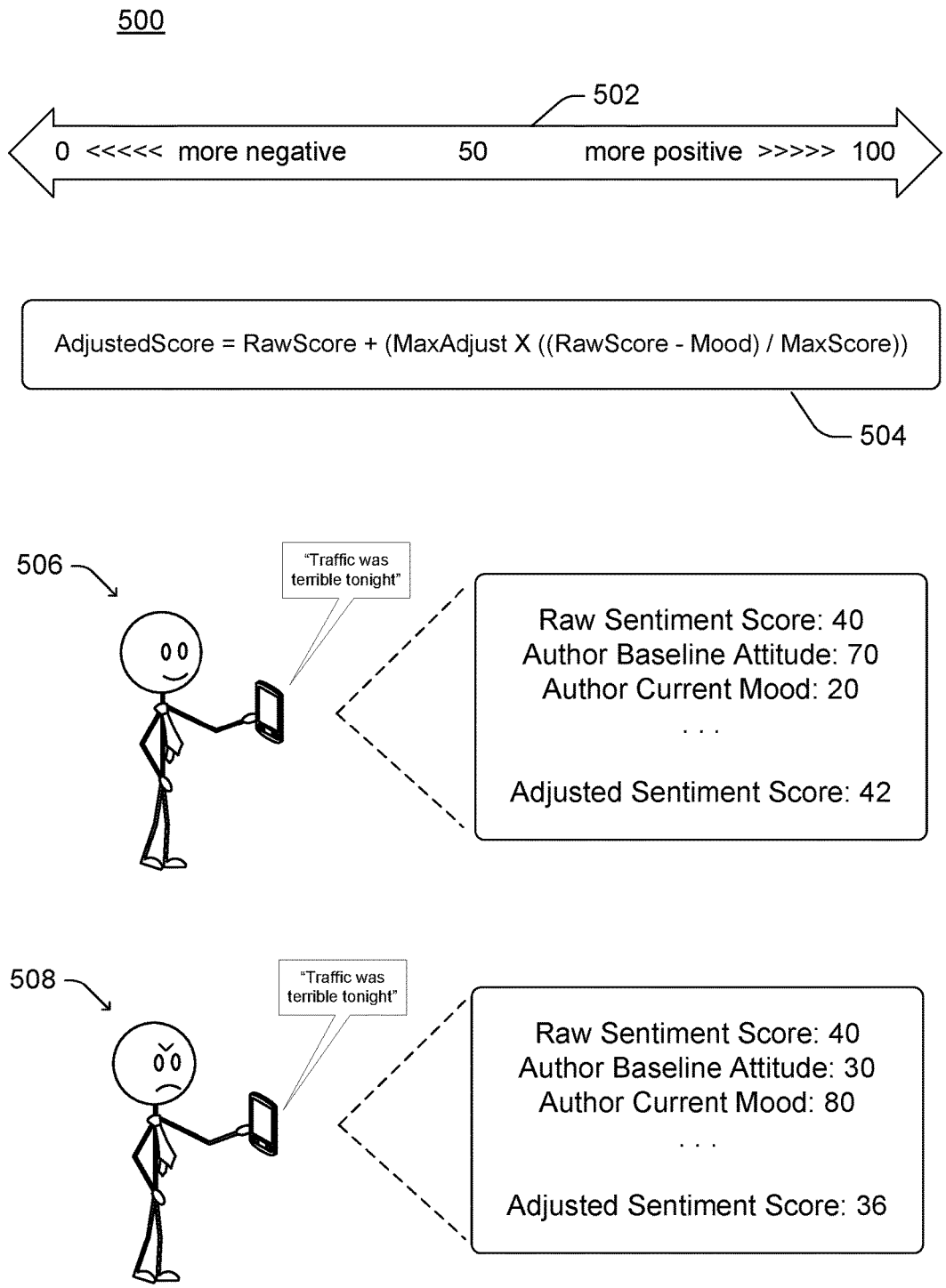

FIG. 5 presents another example scenario 500 that illustrates other aspects of adjusting sentiment scoring for online content using baseline attitude of content author, including aspects similar to the example process 300 of FIG. 3. The scale 502 describes the values, from 0 to 100, used for: the raw sentiment score, baseline attitude, and adjusted sentiment scores. For example, on the scale 502, a lower number is more negative, and a higher number is more positive. In this example aspect of adjusting sentiment scoring for online content using baseline attitude of content author, various algorithms could be used to generate an adjusted sentiment score. The example algorithm 504 represents a possible algorithm for generating mood-adjusted sentiment scores in accordance with example process.

In example scenario 500, the author Polly 506 again authors the online content "traffic was terrible tonight." Polly's baseline attitude remains 70 and the raw sentiment score for the online content remains 40. Polly's current mood, however, is 20, much more negative than the baseline attitude. Using the example algorithm 504, the adjusted sentiment score for Polly's online content is 42 rather than 37. Because Polly's mood is more negative, negative online content is made more positive, and the adjusted sentiment score is therefore higher (i.e., more positive) than the raw sentiment score. In the example scenario 500, the author Ivan 508 also authors the online content "traffic was terrible tonight." Similarly, Ivan's baseline attitude remains 30 and the raw sentiment score for the online content remains 40. Ivan's current mood, however, is 80, much more positive than the baseline attitude. Using the example algorithm 504, the adjusted sentiment score for Ivan's online content is 36 rather than 41. Because Ivan's mood is much more positive, negative online content is made more negative, and the adjusted sentiment score is therefore lower (i.e., more negative) than the raw sentiment score.

In the example algorithm 504, the author's current mood replaces the author's baseline attitude with respect to the example algorithm 404 of FIG. 4. However, in other examples, the author's current mood could be combined with, rather than replace, the author's baseline attitude. For example, the algorithm could use a weighted average of the author's baseline attitude and current mood, in which the weighting is determined by frequency of authoring and/or the distance between the baseline attitude and the current mood.

Other example scenarios are contemplated, with different algorithms that generate different values for the adjusted sentiment scores. For example, in the determination of adjusted and mood-adjusted sentiment scores, discussed with reference to FIGS. 2 and 3, the algorithms account for authors demonstrating sentiment that deviates from their normal sentiment and give extra weight (which can be positive or negative weight) to the abnormal online content instances. Another algorithm, however, could be used to normalize the adjusted sentiment scores by adjusting the raw sentiment scores toward a median, based on the distance between each author's baseline attitude and the median attitude. In this example, if an author's baseline attitude is 65 and an instance of online content for the author has a raw sentiment score of 65, the adjusted sentiment score would be normalized to a neutral value (e.g., 50). In contrast, if an author's baseline attitude is 65 and an instance of online content for the author has a raw sentiment score of 75, the adjusted sentiment score would be normalized to a more positive value (e.g., 60). This normalization may be achieved using various algorithms such as the equation:

$$NormScore=AdjustedScore+(MaxAdjust\times((RawScore-MedScore)/MaxScore)))$$

where NormScore is a normalized score and MedScore is a median score such as a median raw sentiment score of the author's online content instances, a median raw sentiment score of the all the online content instances of all the authors using the particular online environment, and so forth.

Figure 6:
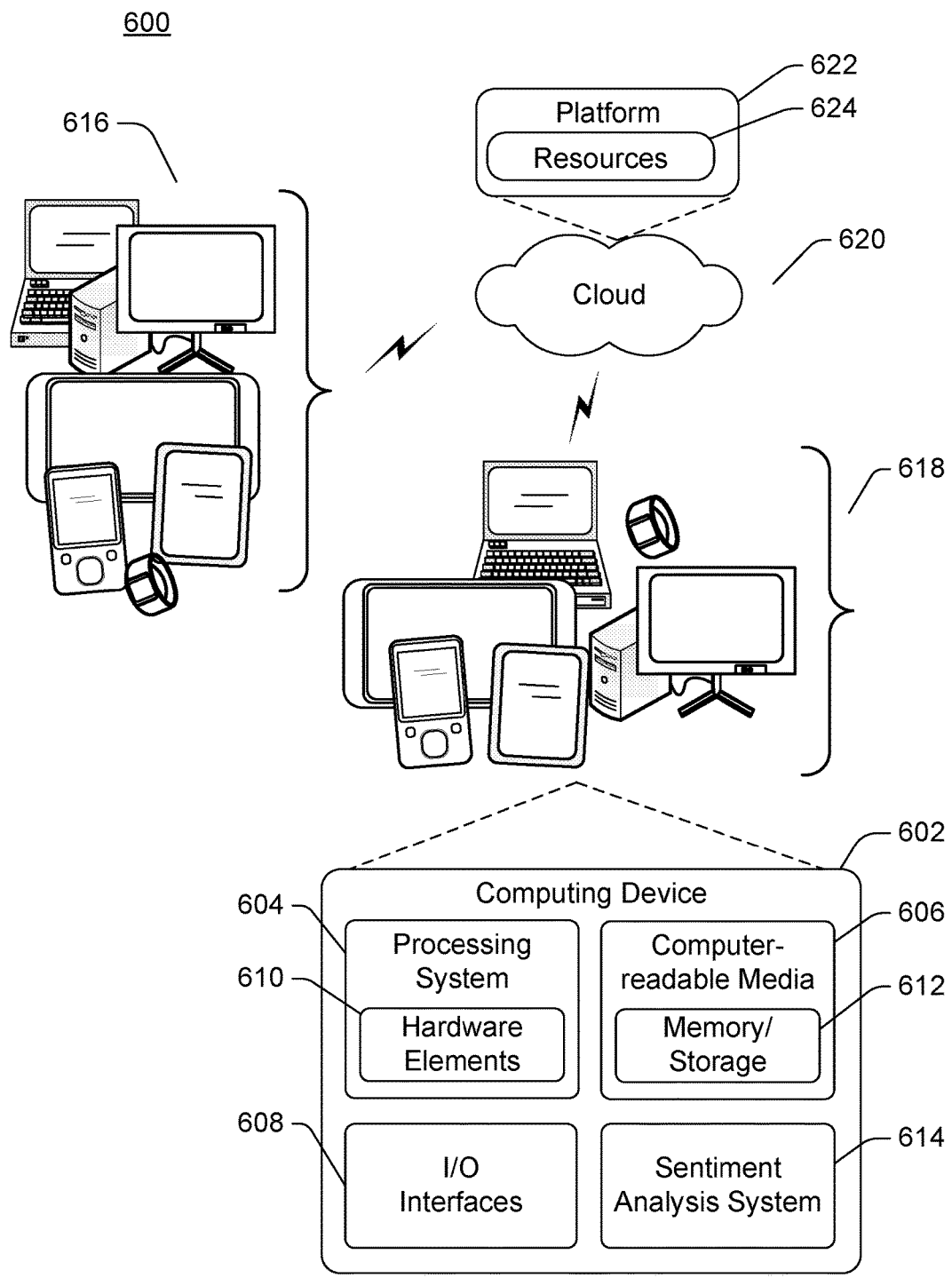
FIG. 6 illustrates an example system generally that includes an example computing device that is representative of one or more computing systems and/or devices that may implement the various techniques described herein.

FIG. 6 illustrates an example system generally at 600 that includes an example computing device 602 that is representative of one or more computing systems and/or devices that may implement the various techniques described herein. This is illustrated through inclusion of sentiment analysis system 614, which may be configured to generate adjusted sentiment scores for online content that is generated by an author using a device such as any of example devices 616. The adjusted sentiment score may be presented to the author (or another user) on the original device or on another device such as any of example devices 618. Computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 604 is representative of functionality to perform one or more operations using hardware. Accordingly, processing system 604 is illustrated as including hardware elements 610 that may be configured as processors, functional blocks, and so forth. This may include implementation in hardware as an application specific integrated circuit or other logic device formed using one or more semiconductors. Hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 606 is illustrated as including memory/storage 612. Memory/storage 612 represents memory/storage capacity associated with one or more computer-readable media. Memory/storage component 612 may include volatile media (such as random access memory (RAM)) and/or nonvolatile media (such as read only memory (ROM), Flash memory, optical disks, magnetic disks, and so forth). Memory/storage component 612 may include fixed media (e.g., RAM, ROM, a fixed hard drive, and so on) as well as removable media (e.g., Flash memory, a removable hard drive, an optical disc, and so forth). Computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 602. By way of example, and not limitation, computer-readable media may include "computer-readable storage media" and "computer-readable signal media."

"Computer-readable storage media" refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. Computing device 602 may be configured to implement particular instructions and/or functions corresponding to the software and/or hardware modules. Accordingly, implementation of a module that is executable by computing device 602 as software may be achieved at least partially in hardware, e.g., through use of computer-readable storage media and/or hardware elements 610 of processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of computing device 602 and are not limited to the specific examples of the techniques described herein. This functionality may also be implemented all or in part through use of a distributed system, such as over a "cloud" 620 via a platform 622 as described below.

Cloud 620 includes and/or is representative of a platform 622 for resources 624. Platform 622 abstracts underlying functionality of hardware (e.g., servers) and software resources of cloud 620. Resources 624 may include applications and/or data that can be utilized while computer processing is executed on servers that are remote from computing device 602. Resources 624 can also include services provided over the Internet and/or through a subscriber network, such as a cellular or Wi-Fi network.

Platform 622 may abstract resources and functions to connect computing device 602 with other computing devices. Platform 622 may also serve to abstract scaling of resources to provide a corresponding level of scale to encountered demand for resources 624 that are implemented via platform 622. Accordingly, in an interconnected device embodiment, implementation of functionality described herein may be distributed throughout system 600. For example, the functionality may be implemented in part on computing device 602 as well as via platform 622 that abstracts the functionality of the cloud 620.

Various actions performed by various interfaces, systems, and modules are discussed herein. A particular interface, system, or module discussed herein as performing an action includes that particular interface, system, or module itself performing the action, or alternatively that particular interface, system, or module invoking or otherwise accessing another component, interface, system, or module that performs the action (or performs the action in conjunction with that particular interface, system, or module). Thus, a particular interface, system, or module performing an action includes that particular interface, system, or module itself performing the action and/or another interface, system, or module invoked or otherwise accessed by the particular interface, system, or module performing the action.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. In an online environment to determine author sentiment with improved accuracy by inclusion of author tendencies, a method implemented by a computing device, the method comprising:

obtaining, by the computing device, data describing a number of prior instances of online content associated with an author;

generating, by the computing device, a plurality of raw sentiment scores based on the prior instances, in which, each said raw sentiment score corresponds to a respective said prior instance of online content that is generated in isolation without consideration of a personality of the author;

determining, by the computing device, a baseline attitude of the author based on the raw sentiment scores as identifying the personality of the author;

obtaining, by the computing device, data describing a current instance of online content associated with the author;

generating, by the computing device, a current raw sentiment score based on the current online content instance;

generating, by the computing device, an adjusted sentiment score for the current online content instance by adjusting the current raw sentiment score based on the baseline attitude, the adjusted sentiment score representing a sentiment of the author towards the current online content instance; and categorizing, by the computing device, the current online content instance as identifying a qualitative sentiment of the online content instance of the author based on the adjusted sentiment score.

2. The method of claim 1, further comprising:

detecting, based at least in part on the raw sentiment score for the current online content instance of the author, variance from the baseline attitude over time;

determining, responsive to the variance, a mood of the author, the mood identifying a temporary different personality of the author; and generating a mood-adjusted sentiment score for the online content by using the mood of the author to adjust the raw sentiment score for the online content instance.

3. The method of claim 2, the detecting the variance further comprising:

comparing the raw sentiment score for an instance of online content with the baseline attitude; and determining that a threshold number of online content instances, within a selected time period, have a raw sentiment score that differs from the baseline attitude by a threshold amount.

4. The method of claim 3, the determining the mood further comprising detecting an increase or decrease in a frequency of authoring online content and, responsive to the increase or the decrease reaching a threshold, incorporating the increase or the decrease into determining the mood.

5. The method of claim 2, further comprising detecting an end to the variance of the online content of the author from the baseline attitude and, responsively, ceasing to generate the mood-adjusted sentiment score and resuming generation of the adjusted sentiment score for the online content.

6. The method of claim 1, the raw sentiment scores having been generated using a lexical analysis, a keyword analysis, statistical methods, knowledge representation techniques, or a sentiment analysis of the online content instances.

7. The method of claim 6, the determining the baseline attitude further comprising using a demographic profile of the author to further identify the personality of the author.

8. The method of claim 1, further comprising:

detecting that the current online content instance is related to a particular subject matter area;

responsively, generating a subject-matter attitude of the author for the current online content instance related to the particular subject matter; and generating a subject-matter-adjusted sentiment score for the current online content instance by using the subject-matter attitude of the author to adjust the raw sentiment score for the online content instance.

9. The method of claim 1, wherein the generating of the plurality of raw sentiment scores are generated in isolation without consideration of the personality of the author and wherein the baseline attitude of the author identifies the personality of the author.

10. In an online environment to determine author sentiment with improved accuracy by inclusion of author tendencies, a device comprising:
a sentiment scoring module implemented at least partially in hardware to obtain a raw sentiment score for an instance of online content, the raw sentiment score comprising a sentiment score for the online content instance that is generated based on the online content instance without considering an attitude of the author;
an attitude module implemented at least partially in hardware to determine a baseline attitude of an author of the online content instance, the baseline attitude of the author identifying a personality of the author;
a scoring adjustment module implemented at least partially in hardware to generate an adjusted sentiment score for the online content instance by using the baseline attitude of the author to adjust the raw sentiment score for the online content instance by weighting the raw sentiment score to account for the baseline attitude; and
an evaluation module implemented at least partially in hardware to use the adjusted sentiment score to categorize the online content instance, the categorization identifying the qualitative sentiment of the online content instance.

11. The device of claim 10, further comprising:
a mood module, implemented at least partially in hardware to:
detect, based on the online content instance of the author, variance from the baseline attitude over time; and
determine, responsive to the variance, a mood of the author, the mood identifying a temporary different personality of the author; and
the scoring adjustment module being further to generate a mood-adjusted sentiment score for the online content by using the mood of the author to adjust the raw sentiment score for the online content instance.

12. The device of claim 11, the mood module being further to detect the variance by:
comparing the raw sentiment score for an instance of online content with the baseline attitude; and
determining that at threshold number of online content instances, within a selected time period, have a raw sentiment score that differs from the baseline attitude by a threshold amount.

13. The device of claim 12, the mood module being further to determine the mood of the author by detecting an increase or decrease in a frequency of authoring online content and, responsive to the increase or the decrease reaching a threshold, incorporating the increase or the decrease into determining the mood.

14. The device of claim 11, mood module being further to detect an end to the variance of the online content from the baseline attitude and, responsively, ceasing to generate the second adjusted sentiment score and resuming generation of the first adjusted sentiment score for the online content.

15. The device of claim 10, the raw sentiment score having been generated using a lexical analysis, a keyword analysis, statistical methods, knowledge representation techniques, or a sentiment analysis of the online content.

16. The device of claim 15, the attitude module being further to determine the baseline attitude by using a demographic profile of the author to further identify the personality of the author.

17. The device of claim 10, the sentiment scoring module being further to determine a subject matter area for the online content instance;
the attitude module being further to detect that the raw sentiment score for online content is related to a particular subject matter area and, responsively, generate a subject-matter attitude of the author for the online content instance related to the particular subject matter; and
the scoring adjustment module being further to adjust the raw sentiment score of the online content instance by generating a subject-matter adjusted sentiment score for the online content by using the subject-matter attitude of the author to adjust the raw sentiment score for the online content instance.

18. The device of claim 10, wherein the evaluation module is further implemented at least partially in hardware to use the adjusted sentiment score to assign a sentiment value of the current online content instance, the sentiment value identifying a quantitative weight of a sentiment of the author as expressed in the current online content instance.

19. In an online environment to determine author sentiment with improved accuracy by inclusion of author tendencies, a system comprising:
means for generating, by the computing device, a plurality of raw sentiment scores based on a number of prior instances of online content associated with an author, in which, each said raw sentiment score corresponds to a respective said prior instance of online content that is generated in isolation without consideration of a personality of the author;
means for determining a baseline attitude of the author based on the raw sentiment scores as identifying the personality of the author;
means for generating a current raw sentiment score based on a current online content instance associated with the author;
means for generating an adjusted sentiment score for the current online content instance by adjusting the current raw sentiment score based on the baseline attitude, the adjusted sentiment score representing a sentiment of the author towards the current online content instance; and
means for categorizing the current online content instance as identifying a qualitative sentiment of the online content instance of the author based on the adjusted sentiment score.

20. The system of claim 19, further comprising
means for detecting, based on the online content instance of the author, variance from the baseline attitude over time; and
means for determining a mood of the author, the mood identifying a temporary different personality of the author, and wherein the generating means of the adjustment sentiment score includes means for generating a mood-adjusted sentiment score for the online content by using the mood of the author to adjust the raw sentiment score for the online content instance.

\* \* \* \* \*